United States Patent [19]

Malik

[11] Patent Number: 4,765,357
[45] Date of Patent: Aug. 23, 1988

[54] PILOT OPERATED FLOW CONTROL VALVE FOR HYDRAULIC SYSTEMS

[75] Inventor: Marvin J. Malik, Bloomfield Hills, Mich.

[73] Assignee: General Motors Corporation, Detroit, Mich.

[21] Appl. No.: 83,467

[22] Filed: Aug. 10, 1987

[51] Int. Cl.$^4$ ............................................. F16K 31/34
[52] U.S. Cl. .................... 137/195; 137/113; 137/413
[58] Field of Search ............... 137/195, 113, 114, 413, 137/414, 415

[56] References Cited

U.S. PATENT DOCUMENTS

| | | | |
|---|---|---|---|
| 2,293,867 | 8/1942 | Temple | 137/195 |
| 2,436,147 | 2/1948 | LeClair | 251/63 |
| 2,939,476 | 6/1960 | Absolon | 137/195 |

*Primary Examiner*—Alan Cohan
*Attorney, Agent, or Firm*—Donald F. Scherer

[57] ABSTRACT

A scavenger system (10) for a hydraulic recirculating installation, such as may be employed with a vehicular transmission (11), which employs a sump (18) to collect the recirculating hydraulic fluid (19). The sump (18) is to be maintained essentially dry, and as a result the requisite volume of hydraulic fluid (19) for the recirculating installation is stored within an independent reservoir (28). The sump (18) is provided with one or more collecting wells (21), and a unique pickup head assembly (22) is received within each well (21). The pickup head assembly incorporates a pilot valve (60) that interacts with an inlet valve (55). The inlet valve (55) effects communication between the well 21 and a conduit means (29). The conduit means (29) communicates with the inlet port (30) of a circulating pump (25) from a fluid reservoir (28) as well as from the pickup head assembly (22). A float (99) senses the level of the fluid (19) within the well (21) and effects a corresponding reaction to the spool valve (60). The spool valve (60) interacts with the inlet valve (55) to control communication between the well (21) and the conduit means (29) in response to the level of the hydraulic fluid (19) within the well, as sensed by the float (99). The opening and closing of the inlet valve (55) in response to the pilot valve (60) thus serves to admit the flow of hydraulic fluid freely therethrough but to preclude the admission of air.

1 Claim, 3 Drawing Sheets

PILOT OPERATED FLOW CONTROL VALVE FOR HYDRAULIC SYSTEMS

TECHNICAL FIELD

The present invention relates to recirculating hydraulic installations. In general, the present invention relates to recirculating hydraulic installations wherein a sump is provided to collect the hydraulic fluid and a reservoir other than the sump is provided to store the hydraulic fluid in order that the sump may be maintained in an essentially dry condition. Ore particularly, the present invention relates to a fluid scavenging system wherein the sump is preferably provided with one or more collecting depressions, or wells, within which the hydraulic fluid can pool and from which the fluid can be scavenged through one or more pickup head assemblies and be returned to the storage reservoir. The pickup head assemblies incorporate a novel arrangement which readily admits fluid but which substantially precludes the admission of air. Specifically, the present invention relates to the use of a pickup head assembly which employs a pilot valve that interfaces with an inlet valve. The pilot valve operates in response to a sensed level of hydraulic fluid within the sump in order not only to effect an appropriate opening of the inlet valve to admit hydraulic fluid but also to effect an appropriate closing of the inlet valve and thereby preclude the admission of air.

BACKGROUND OF THE INVENTION

Recirculating hydraulic installations are particularly adapted to the lubrication of automotive engines and transmissions. Lubrication serves not only to reduce friction, and thus wear, between the moving parts but also to disperse heat, to reduce corrosion and, in an engine, to assist in the sealing action of the piston rings.

In most modern engines, or transmissions, the lubricating fluid is stored in the pan, or sump, that normally comprises the lowest part of the crankcase, or transmission housing. The fluid is fed by a pump to the moving parts to be lubricated, and the fluid returns, by gravity, to the sump. In addition to serving as the reservoir, the sump also serves as a cooler because it is normally located in, or in proximity to, the air stream beneath the vehicle.

It must be appreciated that moving parts can lose considerable energy by virtue of parasitic drag resulting from high speed contact between the moving parts and the lubricating fluid. In addition, the turbulence created by such contact results in considerable entrainment of air in the hydraulic fluid. Aeration of hydraulic fluids such as lubricating oils, and particularly in the high temperature environment of an engine, or the like, allows a build up of acids in the lubricating fluid. Those acids are, of course, quite deleterious to the parts which the fluid is intended to lubricate.

In an attempt to obviate such difficulties many high performance vehicles employ a "dry sump" system for the engine and/or transmission. Dry sump systems store the lubricating fluid in an independent tank, or reservoir, which may, incidentally, also function as a cooling radiator. Prior known dry sump systems deliver the lubricating fluid from the reservoir to the parts to be lubricated by a first pump, and as that fluid collects in the sump it is generally scavenged from the sump by a second pump that returns the fluid to the reservoir in order to maintain the sump essentially dry.

The heretofore known dual pump arrangements have been quite successful in maintaining the sump relatively dry, but in doing so such arrangements have, unfortunately, fostered the entrainment of a considerable amount of air within the lubricating fluid. The undesirable entrainment of air results from unsuccessfully attempting to balance the rate, or volume, of the flow out of the sump (occasioned by the action of one pump) with the rate, or volume, of the flow returning to the sump (occasioned by the action of the other pump in delivering the fluid for the purposes of lubrication). This inherent difficulty with dual pump arrangements has been further compounded by the fact that in a moving environment, such as in a vehicle, the sump cannot be maintained in any one attitude. Thus, the normal motion of the vehicle tends to move the fluid toward and away from the intake to that pump which serves to scavenge the sump, thereby effecting the undesirable intrusion of air into the system.

In some environments it may be possible to provide a sump having sufficient depth so that the intake to the recirculating pump will remain submerged within the fluid in the sump during the normal movement of the vehicle over the roadway. However, the clearance between the roadway and the sump, and particularly in high performance vehicles, is not always sufficient to permit the use of a sump having the configuration necessary to assure that the intake for the recirculating pump will remain submerged.

SUMMARY OF THE INVENTION

It is, therefore, a primary object of the present invention to provide a scavenging system for hydraulic fluid that will maintain the sump essentially dry and yet preclude the entrainment of air into the fluid.

It is another object of the present invention to provide a scavenging system, as above, that employs a unique arrangement which permits fluid to be scavenged from the sump only when the level of the fluid therein rises above a predetermined level and then only for so long as the fluid remains at, or above, that level.

It is a further object of the present invention to provide a scavenging system, as above, that will achieve the desired results without the use of a second pump.

It is yet another object of the present invention to provide a scavenging system, as above, that will be fully functional within the minimal clearance dimensions provided between the sump and the roadway of even high performance vehicles.

These and other objects of the invention, as well as the advantages thereof over existing and prior art forms, which will be apparent in view of the following detailed specification, are accomplished by means hereinafter described and claimed.

In general, a scavenging system embodying the concepts of the present invention employs an independent reservoir to store the requisite volume of fluid required for the hydraulic installation with which the scavenging system is to be used. A circulating pump delivers the hydraulic fluid from the reservoir to the location where it is to perform its function, and the fluid then collects, by gravity, within one or more sumps.

One or more depressions, or wells, are preferably located at the lowest level(s) of each sump. In order to maintain the sump(s) essentially dry, at least one pickup head assembly is located in each well. The inlet port of the circulating pump communicates not only with the reservoir but also with each pickup head assembly by virtue of a conduit means.

The pickup head assembly incorporates a novel pilot, or operating, valve arrangement which interacts with, and controls, the opening and closing of an inlet valve in response to the level of the hydraulic fluid within the well. By appropriately placing the pickup head assembly within each well one can maintain the sump(s) essentially dry.

An exemplary embodiment of a dry sump scavenging system embodying the concepts of the present invention is shown by way of example in the accompanying drawings and is described in detail in the following specification without attempting to show all of the various forms and modifications in which the invention might be embodied; the invention being measured by the appended claims and not by the details of the specification.

DESCRIPTION OF AN EXEMPLARY EMBODIMENT

An exemplary scavenging system embodying the concepts of the present invention is identified generally by the numeral 10 on the attached drawings. Although the scavenging system 10 is readily adaptable for inclusion in any recirculating system for hydraulic fluid wherein it is desired that the collecting pan, or sump, remain essentially dry, and wherein an independent fluid supply reservoir is to be employed, it will be appreciated that the scavenging system 10 is particularly suited for inclusion in conjunction with vehicular engines, transmissions, or other such mechanisms. Accordingly, and in order to facilitate an understanding of the invention, the disclosure of an exemplary embodiment of the scavenging system 10 shall be described in the operational environment of a vehicular installation such as a transmission that is designated generally by the numeral 11 on the attached drawings.

Figure 1:
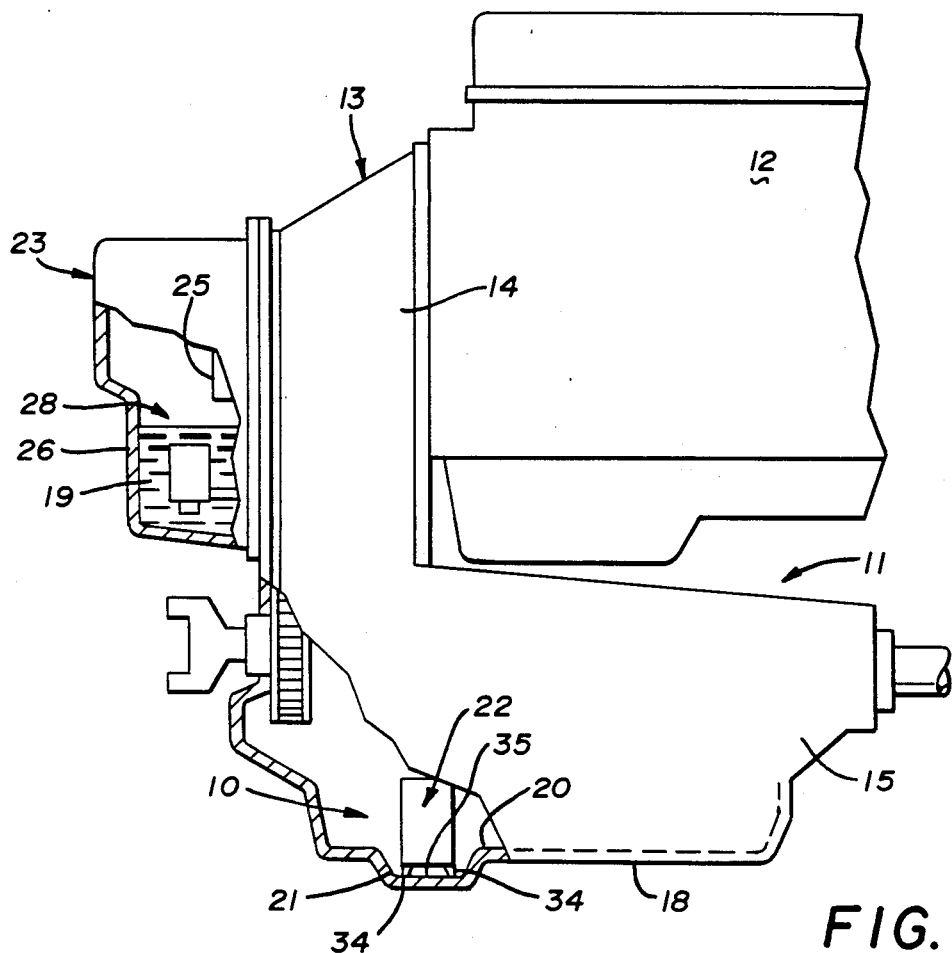
FIG. 1 is a side, elevational view, partly in section, of a representative operating environment, in this case a vehicular transmission, in which hydraulic fluid such as lubricating oil is required to be recirculated and to which environment a scavenging system embodying the concepts of the present invention is particularly adapted in order to maintain the fluid collecting sump, located at the lower extremity of the transmission housing, essentially dry.

With particular reference, then, to FIG. 1 the transmission 11 is depicted in conjunction with a conventional engine 12. The transmission 11 has a housing 13 with an upper portion 14 that is secured to the engine 12 and encloses a torque converter, not shown. The lower portion 15 of the housing 13 encloses the transmission gearing, represented collectively and schematically in FIG. 3 by the numeral 16. A pan, or sump, 18 is provided beneath the lower portion 15 of the transmission housing 13 for collecting the hydraulic fluid 19, in this case the lubricating oil, as it flows, by gravity, from the transmission gearing 16.

It should be noted that in those installations wherein the sump 18 also serves as the fluid reservoir, the sump is, in most instances, demountably secured to the transmission housing 13. When employing a dry sump arrangement, however, one may form the sump 18 as an integral part of the housing 13.

In either event, the floor 20 of the sump 18 is preferably provided with one or more depressions, or wells, 21 which define the lowermost level(s) of the sump 18 to which the fluid 19 in the sump 18 would tend naturally to flow and within which the fluid will therefore localize, or pool, to be scavenged. As depicted, the well 21 may extend transversely across the floor 20 of the sump 18. One or more pickup head assemblies 22, hereinafter more fully described, are received within each such well 21.

In the description which follows, and particularly with respect to the pickup head assemblies, a common structural arrangement may be employed at more than one location. When referring generally to that type of structural arrangement a single numerical designation shall be employed. However, when one of the particular structural arrangements is to be individually referenced, it shall be designated by virtue of a letter suffix employed in combination with the numerical designation employed for general identification of that structural arrangement. Thus, there are two pickup head assemblies 22, and the individual pickup head assemblies are, therefore, identified as 22A and 22B on the drawings. This same suffix convention shall be employed throughout the specification.

Inasmuch as the well 21 extends transversely across the sump 18, one pickup head assembly 22A (FIG. 3) may be disposed at one lateral end of the well 21, and a second pickup head assembly 22B may be disposed at the opposed lateral end of the well 21. The details of the unique pickup head assemblies 22 will be hereinafter more fully described.

Figure 2:
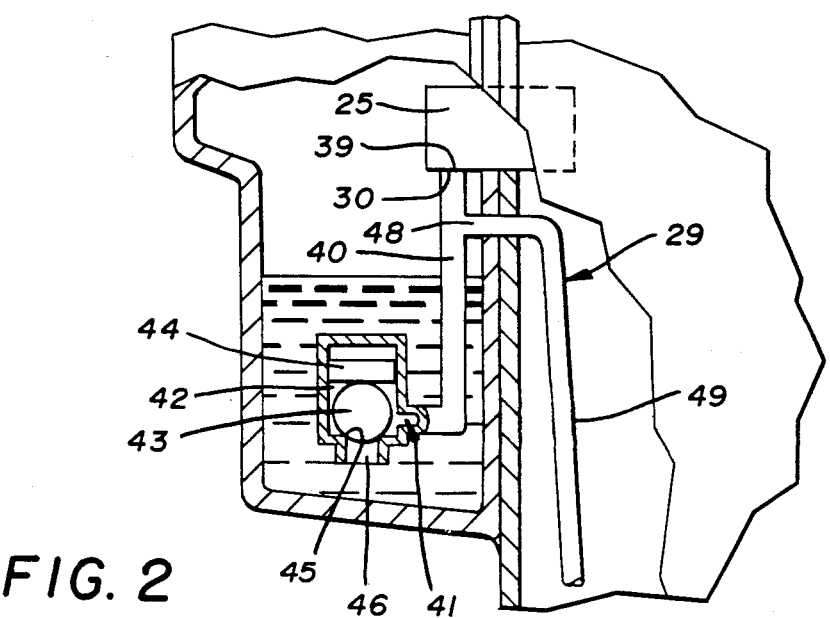
FIG. 2 is an enlarged area of FIG. 1 with that portion of the conduit means which serves as a displaced inlet port for the recirculating pump being depicted in cross section.

The transmission 11 also has an end cover 23 which may be secured to the upper portion 14 of the transmission housing 13 and may enclose a typical, gear type, circulating pump 25. With the pump 25 so located, the lower portion 26 of the end cover 23 may incorporate a storage reservoir 28 for the hydraulic fluid 19. Conduit means, identified generally by the numeral 29 (FIGS. 2 and 3) and hereinafter more fully described, effect the desired communication between the intake port 30 of the circulating pump 25 and the fluid storage reservoir 28 as well as between each of the pickup head assemblies 22 and the intake port 30 of pump 25.

Figure 3:
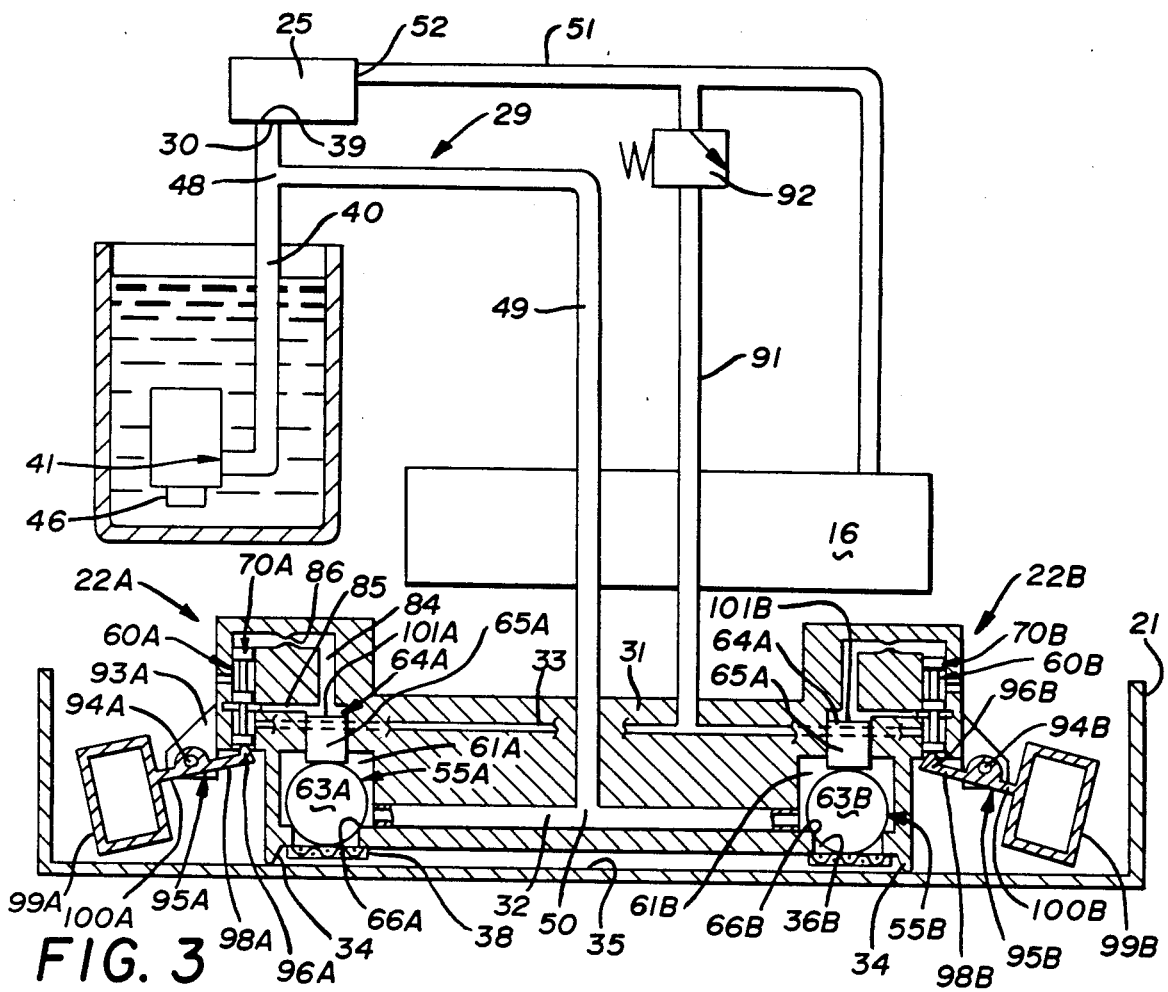
FIG. 3 is a schematic, elevational view of the operating environment depicted in FIGS. 1 and 2 in which a scavenging system embodying the concepts of the present invention is incorporated, the pickup head assembly of said system being depicted in section.

With particular reference to FIG. 3, the pickup head assemblies 22A and 22B are supported at the opposite ends of a support beam 31, the interior of which is provided with the hereinafter more fully described passageways 32 and 33. The aforesaid arrangement of the pickup head assemblies 22 and the support beam 31 may present a plurality of feet 34 by which that arrangement can rest on the floor 35 of the well 21—which floor 35 is, in effect, the subfloor of sump 18—in order to maintain the inlet port 36 of each pickup head assembly 22 modestly upwardly from any sludge that might accumulate on the floor 35 of the well 21. Of course, a screen 38 may be disposed across the inlet port 36 to preclude the admission of undesired particulate matter.

The intake port 30 of the circulating pump 25 communicates with one end 39 of a first branch 40 of the conduit means 29. The other end 41 of branch 40 is located within the lower extremity of the reservoir 28 and serves as the vertically displaced intake port for the pump 25. As is, however, best seen from FIG. 2, the end 41 opens through a valve chamber 42 wherein a check ball 43, biased by a weight 44, normally engages a seat 45 which circumscribes the port 46 in end 41 of branch 40.

One end 48 of a second branch 49 of the conduit means 29 communicates directly with the first branch 40, and the second end 50 of branch 49 communicates with the passageway 32 in the support beam 31.

A gallery, or other distribution header, 51 communicates with the output, or discharge, port 52 of the pump 25 and delivers the fluid 19 to preselected locations within the transmission gearing 16, as is well known to the art.

In order to accommodate the varying attitudes of the sump 18 a plurality of wells 21 may be employed. They may be located longitudinally, laterally and/or obliquely, one with respect to the other. Irrespective of whether one or more pickup head assemblies 22 are required, each responds to the level of the hydraulic fluid 19 in the particular well 21 within which that pickup head assembly 22 is positioned in order to effect a scavenging of the fluid 19 from that well and thereby maintain the sump 18 essentially dry.

Turning now to a detailed description of the novel pickup head assemblies 22 embodying the concept of the present invention, it will be seen that an inlet valve, indicated generally at 55, is provided within each pickup head assembly 22 to permit the selective flow of hydraulic fluid 19 from the sump 18, through the inlet port 36 and along the passageway 32 which communicates with the conduit means 29.

A pilot valve 60 is also provided within the pickup head assembly 22 to control the opening and closing of the inlet valve 55 in response to the level of the hydraulic fluid 19 within the sump 18, as will be hereinafter described in detail in conjunction with the operational explanation.

With reference to the inlet valves 55, each is provided with an inlet chamber 61 located interiorly of the pickup head assembly 22, and the inlet chamber 61 is accessible to the sump 18 through the inlet port 36. An inlet valve element, which may well be in the form of the ball 63, is movably received within the inlet chamber 61 selectively to open and close the inlet port 36. On the other hand, the inlet chamber 61 remains in continuous communication with the conduit means 29 by virtue of the passage 32 which extends through the support beam 31.

An inlet valve piston chamber 64 opens into the inlet chamber 61, and an inlet valve piston 65 is movable within the piston chamber 64 to engage the inlet valve element 63 and selectively bias the latter toward engagement with the seat 66 which circumscribes the inlet port 36. Before concluding the description of the inlet valve 55, and how it interfaces with the pilot valve 60, greater clarity can be achieved by first turning our attention to the configuration of the pilot valve 60.

With reference to the pilot valve 60 (the details of which are more easily discerned from FIGS. 4 through 6), a spool valve element 70 is axially slidable within a pilot chamber 71. The spool valve element 70 has first and second ends. A first rim 72 extends radially of the spool valve element 70. A piston head 73 is presented axially from the first rim 72 to delineate the first end surface of the spool valve element 70. A second rim 74 also extends radially of the spool valve element 70. A contacting surface 75 is presented axially from the second rim 74 to delineate the second end surface of the spool valve element 70.

A central ridge 76 also extends radially of the spool valve element 70 and is located medially between the first and second rims 72 and 74, respectively. A first recess 78 extends circumferentially of the spool valve element 70 and is disposed between the first rim 72 and the central ridge 76. A second recess 79 similarly extends circumferentially of the spool valve element 70 and is disposed between the second rim 74 and the central ridge 76.

The peripheral edges 80 and 81 of the first and second rims 72 and 74, respectively, as well as the peripheral edge 82 of the central ridge 76, slidably engage the cylindrical interior surface 83 of the pilot chamber 71 and allow the spool valve element 70 to slide axially within the pilot chamber 71.

First and second passages 84 and 85 communicate between the inlet valve piston chamber 64 and the pilot chamber 71. Both passages 84 and 85 are in continuous, uninterrupted communication with the inlet valve piston chamber 64, but only the first passage 84 is in continuous, uninterrupted communication with the pilot chamber 71. As such, the first passage 84 communicates with that portion of the of the pilot chamber 71 against which the piston head 73 on the spool valve element 70 operates. A damping constriction 86 (FIG. 3) is incorporated in the first passage 84 for a purpose more fully hereinafter explained in conjunction with the operating description of the scavenging system 10.

The communication of the second passage 85 with the pilot chamber 71 occurs through a distribution ring 88 that is recessed into the interior surface 83 of the pilot chamber 71 at an axial location along the medial extent of the pilot chamber 71 that is determined not only by the location of two other, hereinafter described, access openings but also by the exterior dimensional configuration of the spool valve element 70.

One of the two additional access openings to the pilot chamber 71 is a vent 89 which affords selective communication between the pilot chamber 71 and the ambient atmosphere exterior of the pickup head assembly 22. The second of the two access openings to the pilot chamber 71 is a feeder port 90 which provides access to the pilot chamber 71 from the passageway 33 in support beam 31. The passageway 33 is, in turn, connected to a source of pressurized actuating fluid. Specifically, the passageway 33 may connect to a conduit 91 that receives a source of hydraulic fluid under a consistent pressure through a regulator valve 92 interposed between the conduit 91 and the gallery 51 that connects to the output port 52 of the pump 25 and which delivers the hydraulic fluid 19 to the gearing 16 within the transmission 11.

Figure 4:
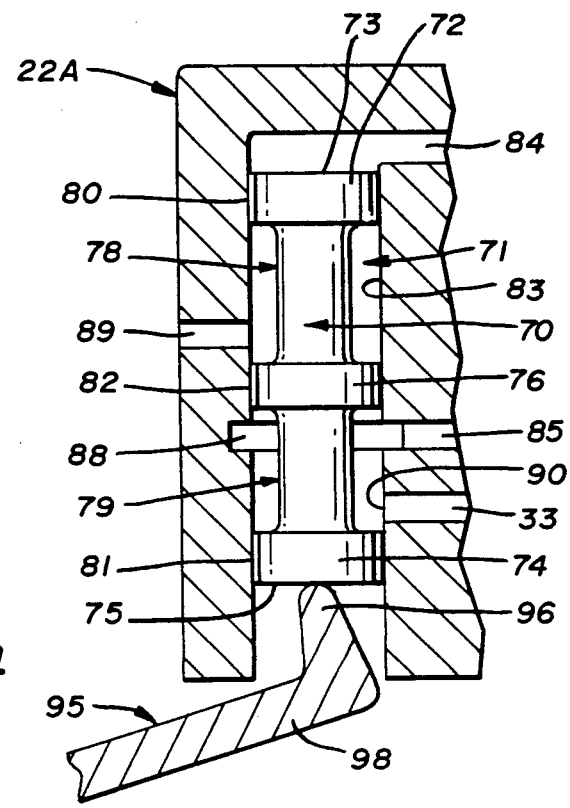
FIG. 4 is an enlarged portion of the pickup head assembly depicting, in section, the spool valve element of the pilot valve incorporated in the pickup head assembly disposed in its first dynamic position, the position it would assume, at least initially, in response to an essentially dry sump.

Access of the second passage 85 to the spool chamber 71, through distribution ring 88, is located axially with respect to the inlet port 90 such that when the spool valve element 70 is disposed as depicted in FIG. 4 the exterior dimensional configuration of the spool valve element 70 permits the source of pressurized fluid 19 provided through passageway 33 to communicate with the inlet valve piston chamber 64 through the second recess 79.

Figure 6:
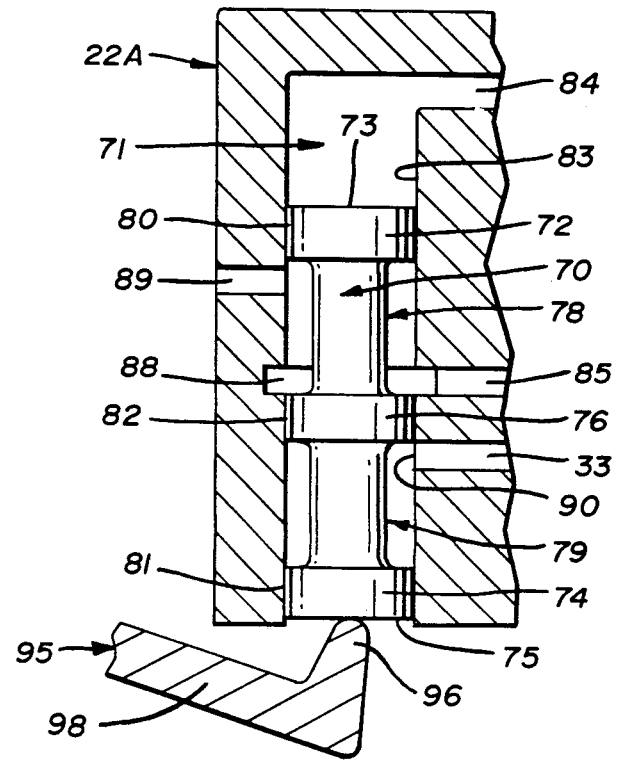

Access of the second passage 85 to the spool chamber 71 is also located axially with respect to the vent 89 such that when the spool valve element 70 is disposed as depicted in FIG. 6 (the hereinafter described second dynamic position) the exterior dimensional configuration of the spool valve 70 permits the inlet valve piston chamber 64 to communicate, via the second passage 85, with the ambient atmosphere exterior of the pickup head assembly 22 through the first recess 78 and the vent 89.

Figure 5:
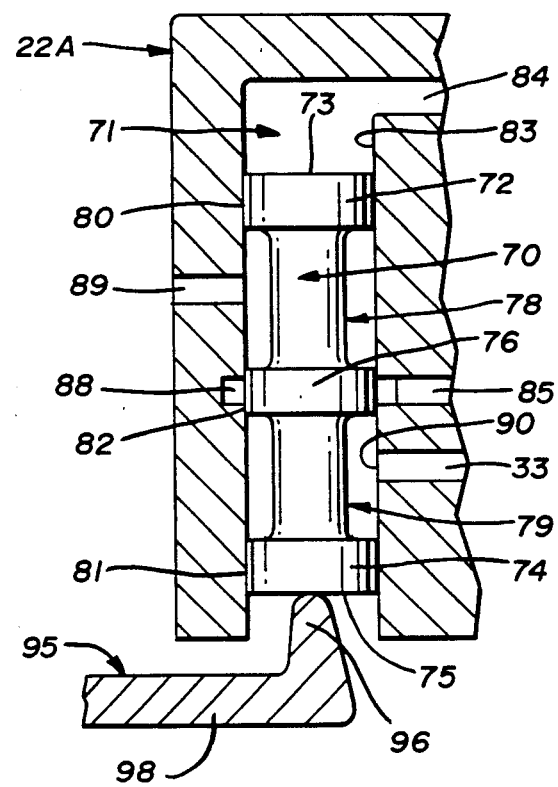
FIG. 5 is a view similar to FIG. 4 but depicting the spool valve element of the pilot valve disposed in its neutral position, the position it might well assume in response to an essentially dry sump when the pressure of the hydraulic fluid acting against the spool valve element is sufficient to exceed the moment applied to the spool valve element by the weight of the float employed to sense the level of the fluid within the sump; and, FIG. 6 is a view similar to FIGS. 4 and 5, and appearing on the same sheet of drawings as FIG. 3, but depicting the spool valve element of the pilot valve disposed in its second dynamic position, the position it would assume in response to a fluid level in the sump which requires that the fluid be scavenged therefrom.

When the spool valve element 70 is disposed in the intermediate, or neutral, position depicted in FIG. 5, the central ridge 76 effectively blocks access of the inlet valve piston chamber 64 to either the source of pressurized fluid or the ambient atmosphere exterior of the pickup head assembly 22. As shown, the central ridge 76 closes access between the distribution ring 88 and the pilot chamber 71 while allowing the vent to communicate with the first recess 78 and allowing the passageway 33 to communicate with the second recess 79.

A bracket 93, as depicted in FIG. 3, is presented from the exterior of the pickup head assembly 22, and a fulcrum pin 94 extends outwardly from the bracket 93. A first degree lever 95 is pivotally mounted from the fulcrum pin 94 such that an engaging finger 96 presented from the outermost end of the resistance arm 98 engages the contacting surface 75 (FIGS. 4-6) on the spool valve element 70. A float 99 is presented from the outermost end of the effort arm 100. The float 99 is disposed within the well 21 of sump 18 to sense the level of the hydraulic fluid 19 within the well 21 (and thus the sump 18), and the engaging finger 96 thus serves to allow axial translation of the spool valve element 70 in response to the level of the hydraulic fluid 19 sensed by the float 99.

Operation

Turning now to a more detailed explanation as to the operation of a pickup head assembly 22 embodying the concepts of the present invention, the pump 25 delivers hydraulic fluid 19 through the gallery 51 to the gearing 16 within the transmission 11. From the gearing 16 the fluid 19 flows, by gravity, into the sump 18 where it pools within the well(s) 21.

However, when the level of the liquid 19 is at or below an acceptable level within any well 21—i.e., when the sump 18 is considered essentially dry—that level is sensed by the float 99 in that well 21, and the float 99 pivots the lever 95 to force the engaging finger 96 against the contacting surface 75 on the spool valve element 70. The force applied by the finger 96 opposes the hydraulic pressure applied against the piston head 73 on spool valve element 70 axially to position the spool valve element 70 in its first dynamic position relative to the pilot chamber 71, as depicted in FIG. 4. With the spool valve element disposed in its first dynamic position, the source of fluid pressure provided through the regulator valve 92 communicates with the inlet valve piston chamber 64, via the second recess 79 and the passage 33, to drive the inlet valve piston 65 against the inlet valve element 63. This action forces the valve element 63 to seal against the seat 66 and thereby preclude the admission of either fluid 19 or air through the inlet port 36.

As noted, the aforesaid pressure build up within the inlet valve piston chamber 64 is reflected against the piston head 73 on the spool valve element 70. Because the surface area presented by the head 101 of the inlet valve piston 65 is designed to be several times larger than the surface area presented by the piston head 73 on one end of the spool valve element 70, the force applied by the float 101 against the contacting surface 75 on the other end of the spool valve element 70 is amplified several fold to constitute the resulting force applied by the pressure of the fluid in chamber 64 against piston 65. That force is, in turn, applied against the valve element 63. The aforesaid relationship between the area of head 101 on the inlet valve piston 65 and the area of the piston head 73 on the spool valve element 70 permits the use of a relatively light float 99.

Conversely, the fluid pressure acting against the piston head 73, when the spool valve element 70 is disposed in the first dynamic position (FIG. 4), can exceed the opposing force applied to the spool valve element 70 by the float 99. As a result, the spool valve element 70 can be moved to its neutral position, as represented by FIG. 5, even though such movement might well entail raising the float 99 above the level at which it would float on the fluid 19 in well 21.

In the situation where all inlet ports 36 are effectively closed by the corresponding inlet valve elements 63, an insufficient volume of fluid 19 is returned from the well(s) 21 to satisfy the demand of the pump 25. This result effects a pressure reduction at the intake port 30 of the pump 25, allowing the ambient pressure acting on the surface of the fluid 19 within the reservoir 28 to lift the check ball 43 against the biasing action of the weight 44, and permit the fluid 19 within the reservoir 28 to satisfy the intake demand of the pump 25.

As an increasing volume of fluid pools within any one of the well(s) 21 the level of the fluid within that well rises to lift the float 99. The lifting of the float 99 causes the engaging finger 96 to move downwardly, and the pressure within the inlet valve piston chamber 64, which communicates with the pilot chamber 71 through passage 84, acts against the piston head 73 presented from the spool valve element 70 to force the spool valve element 70 to follow the engaging finger 96. When the level of the fluid 19 within the well 21 reaches a predetermined level the spool valve element 70 will have axially translated until it is disposed in its second dynamic position, as depicted in FIG. 6, to permit the pressure within the inlet valve piston chamber 64 to exit, via passage 33 and the first recess 78, to atmosphere through the vent 89.

The pressure reduction in chamber 64 reduces one of the forces which combines to maintain the valve element 63 sealed against the seat 66. However, the position of the valve element 63 is determined by the balance of all the forces acting thereagainst. To elaborate, the differential pressure between the inlet chamber 61 and the ambient pressure acting on the fluid 19 in the well 21 is opposed by any fluid pressure in chamber 64 plus the weight of the valve element 63 and the weight of the piston 65. Thus, as the pressure within the inlet chamber 61 is reduced in response to the action of the pump 25, the ambient pressure in the sump 18 overcomes the combined weight of the valve element 63 and the piston 65 to lift the valve element 63 off the seat 66 and admit fluid 19 from well 21 through port 36.

As a correspondingly increased volume of the fluid 19 is scavenged from the well(s) 21 through the pump 25, the pressure at the intake port 30 of pump 25 increases and the weight 44 will bias the ball 43 toward the seat 45 to control the flow through port 46 such that the primary source of fluid being recirculated by the pump 25 will be that which collects in the sump 18. Nevertheless, any additional fluid that is required to satisfy the demand of the pump 25 will, by the action of the check ball 43, come from the reservoir 28.

When the inlet valve 55 is open, and the level of the fluid within any of the well(s) 21 falls to a level that might allow air to enter through the port 36 accessing that well 21, the float 99 lowers to effect translation of the spool valve element 70 to its first dynamic position (FIG. 4) such that pressurized fluid will enter the inlet valve piston chamber 64 (from passageway 33 through the second recess 79 in spool valve element 70) to effect a closure of the inlet valve element 63 against the seat 66 and thereby preclude the admission of air.

It should also be appreciated that movement of the vehicle in which the present invention is being employed over uneven terrain, or a bumpy road, will cause the fluid within the well(s) 21 to slosh and thereby tend to cause the float 99 momentarily to sense an erroneous level of fluid 19 within the well(s) 21. In order to preclude undesirable response of the spool valve element 70 to such momentary aberrations in the level sensing capability of the float 99, the constriction 86 is provided in the passage 84 to dampen the reaction of the spool valve element 70.

As should now be apparent, the use of a pilot valve 60 which interacts with the inlet valve 55 in a novel pickup head assembly 22 embodying the concepts of the present invention will respond to the level of the fluid 19 within the well(s) 21 readily to admit the flow of liquid therethrough and yet respond promptly to a reduction in the level of the fluid in the well(s) in order to preclude the admission of air through the pickup head assemblies 22.

As such, it must be appreciated that a system 10 embodying the concepts of the present invention fully achieves the objects of the invention.

The embodiments of the invention in which an exclusive property or privilege is claimed are defined as follows:

1. In a system for selectively admitting hydraulic fluid while denying admission of air, a pickup head assembly, said pickup head assembly comprising: an inlet chamber accessible through an inlet port; an inlet valve element movably received within said inlet chamber selectively to open and close said inlet port; an inlet valve piston chamber; an inlet valve piston movable within said inlet valve piston chamber to engage said inlet valve element and selectively to bias said inlet valve element toward said inlet port; a pilot chamber; a spool valve element having first and second ends; first and second rims extending radially of said spool valve element, one at each end thereof; a piston head presented axially from said first rim, and a contacting surface presented axially from said second rim: a central ridge medially of said first and second rims, said central ridge also extending radially of said spool element; said first and second rims as well as said central ridge slidably engaging said pilot chamber to permit axial movement of said spool valve element therein; a first, circumferential recess disposed between said first rim and said central ridge, and a second, circumferential recess disposed between said second rim and said central ridge; float means to sense the level of hydraulic fluid exteriorly of said pickup head assembly; means engaging said contact surface on the spool valve element to move said spool valve element axially in response to the level of the hydraulic fluid sensed by said float means; a source of pressurized actuating fluid communicating with said pilot chamber; a vent communicating between said pilot chamber and the ambient atmosphere exterior of said pickup head assembly; first and second passages communicating between said pilot chamber and said inlet valve piston chamber; said first passage communicating with that portion of said pilot chamber against which said spool valve piston head operates; said second passage communicating with that portion of said pilot chamber which permits the selected axial disposition of said spool valve element to effect communication between said inlet valve piston chamber and said vent through said first recess; said second passage also communicating with that portion of said pilot chamber which permits the selected axial disposition of said spool valve element to effect communication between said inlet valve piston chamber and said source of pressurized actuating fluid through said second recess.

* * * * *